(12) United States Patent
Wienand et al.

(10) Patent No.: US 11,506,526 B2
(45) Date of Patent: Nov. 22, 2022

(54) SENSOR ELEMENT, SENSOR MODULE, MEASURING ASSEMBLY AND EXHAUST-GAS RE-CIRCULATION SYSTEM COMPRISING A SENSOR ELEMENT OF THIS TYPE, AND PRODUCTION METHOD

(71) Applicant: HERAEUS SENSOR TECHNOLOGY GMBH, Hanau (DE)

(72) Inventors: Karlheinz Wienand, Aschaffenburg (DE); Tim Asmus, Allendorf-Winnen (DE); Peter Pitzius, Wadern (DE)

(73) Assignee: HERAEUS NEXENSOS GMBH, Kleinostheim (DE)

( * ) Notice: Subject to any disclaimer, the term of this patent is extended or adjusted under 35 U.S.C. 154(b) by 1091 days.

(21) Appl. No.: 15/302,877

(22) PCT Filed: Apr. 14, 2015

(86) PCT No.: PCT/EP2015/058084
§ 371 (c)(1),
(2) Date: Oct. 7, 2016

(87) PCT Pub. No.: WO2015/158720
PCT Pub. Date: Oct. 22, 2015

(65) Prior Publication Data
US 2017/0030753 A1 Feb. 2, 2017

(30) Foreign Application Priority Data

Apr. 17, 2014 (DE) .................... 10 2014 105 483.0

(51) Int. Cl.
*G01F 1/692* (2006.01)
*G01F 1/684* (2006.01)

(52) U.S. Cl.
CPC ............ *G01F 1/692* (2013.01); *G01F 1/6842* (2013.01); *G01F 1/6845* (2013.01)

(58) Field of Classification Search
CPC ...................................... G01F 1/692
See application file for complete search history.

(56) References Cited

U.S. PATENT DOCUMENTS 4,337,746 A * 7/1982 Masaki ............... F02D 41/1441
123/691
5,492,653 A 2/1996 Hochheimer
(Continued)

FOREIGN PATENT DOCUMENTS

CN 101961917 A 2/2011
CN 203389829 U 1/2014
(Continued)

OTHER PUBLICATIONS

International Preliminary Report on Patentability dated Oct. 27, 2016 in related application PCT/EP2015/058084, provided in German and English.
(Continued)

*Primary Examiner* — Lisa M Caputo
*Assistant Examiner* — Alex T Devito
(74) *Attorney, Agent, or Firm* — Hassan Abbas Shakir; Shakir Law PLLC

(57) ABSTRACT

A sensor element with a thin-film structure is made of platinum or a platinum alloy. The structure being applied to a ceramic substrate, in particular an $Al_2O_3$ substrate and being covered by a glass-ceramic coating. The glass-ceramic coating has an outer surface with surface profiling. A sensor module, a measuring assembly, and an exhaust-gas re-circulation system include the sensor element.

10 Claims, 3 Drawing Sheets

(56) References Cited

U.S. PATENT DOCUMENTS

| | | |
|---|---|---|
| 5,658,499 A | 8/1997 | Steinberg |
| 6,617,956 B1 | 9/2003 | Zitzmann et al. |
| 6,872,441 B2 | 3/2005 | Baumann |
| 2002/0175802 A1 | 11/2002 | Horlebein |
| 2003/0152780 A1 | 8/2003 | Baumann |
| 2005/0170098 A1 | 8/2005 | Baumann |
| 2006/0185980 A1 | 8/2006 | Fukuda |
| 2008/0264166 A1 | 10/2008 | Wienand et al. |
| 2011/0104430 A1 | 5/2011 | Mehrabi |
| 2011/0284110 A1 | 11/2011 | Gagnon et al. |
| 2014/0127976 A1* | 5/2014 | Duescher ............ B24B 37/30 451/41 |

FOREIGN PATENT DOCUMENTS

| | | |
|---|---|---|
| DE | 695 02 004 T2 | 9/1998 |
| DE | 199 52 314 A1 | 5/2001 |
| DE | 100 16 485 A1 | 10/2001 |
| DE | 10 144 259 A1 | 3/2003 |
| DE | 101 64 389 A1 | 7/2003 |
| DE | 10 2005 038 538 A1 | 2/2007 |
| DE | 10 2006 058 425 A1 | 6/2008 |
| JP | H06275407 A | 9/1994 |
| JP | 2000227352 A | 8/2000 |
| JP | 2000258202 A | 9/2000 |
| JP | 2006-226860 A | 8/2006 |
| WO | 2007048573 A1 | 5/2007 |

OTHER PUBLICATIONS

Office Action dated Sep. 18, 2014 issued by the German Patent Office (DPMA) in related application DE 10 2014 105 483.0, machine translation provided.

Office Action dated May 28, 2018 by the Chinese Intellectual Property Office in related Chinese patent application CN 201580019248.5, partial machine translation provided.

International Search Report dated Aug. 11, 2015 for PCT/EP2015/058084, translation provided.

Written Opinion dated Oct. 22, 2015 for PCT/EP2015/058084.

Office Action in Korean dated Aug. 22, 2018 by the Korean Intellectual Property Office in related Korean Patent Application 10-2016-7029449; English language summary of the Office Action provided.

* cited by examiner

SENSOR ELEMENT, SENSOR MODULE, MEASURING ASSEMBLY AND EXHAUST-GAS RE-CIRCULATION SYSTEM COMPRISING A SENSOR ELEMENT OF THIS TYPE, AND PRODUCTION METHOD

BACKGROUND OF THE INVENTION

1. Field of the Invention

The invention relates to a sensor element with a thin-film structure having a platinum or a platinum alloy, and a structure incorporating such a sensor 2. Discussion of the Related Art The previously known sensor element forms a temperature measuring element of a flow sensor. The sensor element has a platinum thin-film element which is embedded between two ceramic films. Here, a first ceramic film serves as a substrate for the thin-layer structure of the platinum thin-film element. The second ceramic film forms a glass-ceramic coating which covers the platinum thin-film element.

The flow sensor comprised by the previously known sensor element is preferably used in exhaust gas systems, in particular to control an exhaust-gas recirculation system. Exhaust-gas recirculation systems of this type permit a reduction in nitrogen oxides by re-circulating combustion gases from an internal combustion engine into the combustion chambers. The flow sensor, which, besides the temperature measuring element, additionally comprises a heat output measuring element, determines the mass flow of the exhaust gas within a re-circulating exhaust gas pipe.

It has proven to be a problem that dirt particles, in particular soot particles, contained in the exhaust gas stream accumulate on the sensor element and thus impair the measuring accuracy of the sensor element. Therefore, in WO 2007/048573 A1, it is proposed to integrate a heating element additionally into the temperature measuring element, so that the dirt particles or soot particles accumulating on the temperature measuring element can be removed by being burnt off. Such a structure of a sensor element is relatively complicated and leads to increased production costs. In addition, an additional expenditure of energy is needed in order to remove the dirt particles or soot particles accumulating on the sensor element by burning said particles off at regular intervals.

SUMMARY OF THE INVENTION

The object of the invention is to specify a sensor element which, in particular over a relatively long period of use, exhibits a high measuring accuracy and can be produced economically. In addition, the object of the invention consists in specifying a sensor module, a measuring assembly and an exhaust-gas recirculation system comprising a sensor element of this type. In addition, an object of the invention is to provide economical production methods for a sensor element of this type.

The invention is specifically based on the idea of specifying a sensor element having a thin-layer structure of platinum or a platinum alloy, which is applied to a ceramic substrate, in particular an $Al_2O_3$ substrate, and is covered by a glass-ceramic coating. According to the invention, at least the glass-ceramic coating has an outer surface with surface profiling.

Surprisingly, it has been shown that profiling of the outer surface of the glass-ceramic coating leads to dirt particles, in particular soot particles, having no sufficient area of attack to accumulate on a sensor element. By means of the surface profiling, a dirt-repelling and soot-repelling outer surface is therefore provided, so that the sensor supplies reliable measured results over a long time period. Thus, the use of an additional heating element, such as is known from the prior art, is avoided. This lowers the production costs and reduces the complexity of the sensor element.

A particularly good dirt-repelling and soot-repelling outer surface results if—as provided in a preferred embodiment—the surface profiling has a dimple structure and/or a bump structure. The surface profiling is preferably a microstructure or nanostructure. Provision is likewise made for the dimple structure and/or the bump structure to have dimples and/or bumps the diameter of which generates micro-vortices in the gas at a given flow velocity. The particles contained in the gas are carried past the surface because of their mass moment of inertia and the laminar flow arising above the micro-vortices. The micro-vortices form a flow layer along the surface which prevents particles from reaching the surface. This applies in particular to soot particles which occur during the combustion of fuels based on mineral oil, such as gasoline and/or diesel.

The dimple structure and/or the bump structure preferably has/have a plurality of dimples and/or bumps. The dimples and/or bumps can be arranged regularly or irregularly on the outer surface of the glass-ceramic coating. Provision can also be made for the dimple structure or bump structure to be integrated into the glass-ceramic coating or formed in one piece with the glass-ceramic coating. The regularity or irregularity of the dimple structure or bump structure can result from the respectively selected production method.

In preferred embodiments of the sensor element according to the invention, the surface profiling is formed by additional coating particles, in particular $Al_2O_3$ particles. The outer surface of the glass-ceramic coating can in particular be flocked with additional coating particles, which form the surface profiling. In other words, the surface profiling can be formed by flocking the sensor element with the additional coating particles. The coating particles preferably have the same material as the glass-ceramic coating, so that the coating particles fuse with the glass-ceramic coating in one piece and thus forms part of the glass-ceramic coating. The flocking of the sensor element with coating particles can be carried out particularly simply and permits particularly economical production of the sensor element. As a result of the flocking with additional coating agents, surface profiling which is distinguished in particular by irregularly arranged bumps is formed on the outer surface of the glass-ceramic coating. In general, the outer surface of the glass-ceramic coating is modified such that the accumulation of dirt particles, in particular soot particles, is at least made more difficult.

As an alternative to the flocking of the glass-ceramic coating, the surface profiling can be formed by a screen-printed structure or a laser-structured fused structure. By means of a screen-printed structure, a dimple and/or bump structure which is distinguished by a regular arrangement of dimples or bumps can be produced in a simple way. In particular, the dimples and/or bumps can be arranged in the manner of a pattern in regular rows and/or columns. However, the screen-printed structure can also have an irregular arrangement of dimples and/or bumps. This is similarly true of a laser-structured fused structure. As a result of processing the glass-ceramic coating with a laser, a regular or irregular structure can be introduced into the outer surface of the glass-ceramic coating by means of fusing on glass ceramic material.

In a further preferred embodiment of the sensor element according to the invention, provision is made for the surface profiling to extend over the glass-ceramic coating and the substrate. In other words, the whole of the sensor element can be furnished with the surface profiling over its entire extent. In particular, in the case of a sensor element which, for example, is used for flow measurement in an exhaust gas stream, provision is made for all the surfaces of the sensor element exposed to the exhaust gas stream to be provided with the surface profiling. Overall, in this way a self-cleaning sensor element is formed, which ensures a high measuring accuracy over a long period of use.

According to a secondary aspect, the invention is based on the idea of specifying a sensor module having a sensor structure which has one or more previously described sensor elements. Here, in preferred embodiments, provision can be made for the sensor elements to comprise at least one temperature measuring element and/or at least one heat output measuring element. Overall, the sensor module can be used as a flow sensor module, the flow sensor module having at least one temperature measuring element and at least one heat output measuring element. Preferably, both the temperature measuring element and the heat output measuring element are each provided with the surface profiling, so that accumulation of dirt particles and/or soot particles is avoided.

The sensor module according to the invention can comprise an anemometric measuring device. The anemometric measuring device can in particular be equipped with a constant-temperature control loop. Measuring devices of this type permit the determination of the mass flow by using the electric power which is needed to keep the sensor element at a constant temperature. The advantage of such an anemometric measuring device which is equipped with a constant-temperature control loop is a very short reaction time to a change in the flow.

Finally, within the context of the present invention, a measuring assembly having a flow pipe and a previously described sensor module is disclosed and claimed, wherein the sensor elements project radially into the flow pipe. At least one outer surface of the sensor elements that is arranged within the flow pipe has the surface profiling.

A further secondary aspect of the invention relates to an exhaust-gas recirculation system for an internal combustion engine, comprimising a previously described sensor element and/or a previously described sensor module and/or a previously described measuring assembly. In the exhaust-gas recirculation system according to the invention, provision is preferably made for the flow pipe of the measuring assembly to be a pipe carrying exhaust gas. In other words, in the exhaust-gas recirculation system, the sensor module can be connected to a pipe carrying exhaust gas, the sensor elements of the sensor module projecting into the pipe re-circulating exhaust gas. Preferably, the sensor elements project radially into the pipe re-circulating exhaust gas and are thus exposed to the exhaust gas flow within the pipe. The arrangement of the sensor elements in the radial direction with regard to the pipe re-circulating exhaust gas is preferred, since in this way the flow can be determined centrally in the pipe, which leads to improved measured results.

Within the context of the present invention, methods for producing surface profiling on an outer surface of a sensor element are additionally disclosed and claimed.

Thus, within the context of the invention, a method for producing surface profiling on an outer surface of a sensor element, in particular one previously described, by means of a flocking process is specified, wherein the flocking process has the following steps:
    dipping the sensor element into a quantity of coating particles, in particular $Al_2O_3$ particles;
    blowing off excess coating particles;
    drying the sensor element, preferably in a convection oven;
    baking the coating particles, in particular into the glass-ceramic coating, by heating the sensor element, preferably in a continuous oven.

The present method can be carried out particularly simply and results in surface profiling which efficiently repels an accumulation of dirt particles and/or soot particles. The surface profiling can in particular have irregularly arranged bumps.

In a preferred variant of the aforementioned production method, the sensor element is first arranged on a flocking substrate and the flocking process is then carried out with the flocking substrate. By means of the use of a flocking substrate, a plurality of sensor elements can be provided simultaneously with the surface profiling. Instead of carrying out the aforementioned method steps with respectively individual sensor elements, multiple sensor elements can thus be flocked simultaneously. The flocking substrate on which the sensor elements are arranged is dipped into a quantity of coating particles, in particular $Al_2O_3$ particles. Excess coating particles are then blown off the flocking substrate. After that, the flocking substrate is dried, in particular in a convection oven. Finally, the baking of the coating particles into the glass-ceramic coating of the sensor elements is carried out by heating the flocking substrate, a continuous oven preferably being used. The sensor elements are then separated from the flocking substrate or exposed by dividing the flocking substrate. For this purpose, the flocking substrate can be severed, in particular by means of sawing or cutting, in gaps which are formed between the sensor elements.

A further method for producing surface profiling of a sensor element, in particular one previously described, is based on profiling the glass-ceramic coating by means of a laser, in particular profiling in the form of a grid, so that surface profiling is formed on an outer surface of the sensor element. The laser profiling can be applied simultaneously to multiple sensor elements which are arranged on an appropriate substrate material.

Alternatively, within the context of the invention, a method for producing surface profiling of a sensor element, in particular one previously described, is specified, wherein the surface profiling is produced by means of a screen-printing process. Here, a glass ceramic paste is applied to the sensor element via a screen-printing mask and the sensor element is then heated, so that the glass ceramic paste forms a glass-ceramic coating with an outer surface which has the surface profiling.

BRIEF DESCRIPTION OF THE INVENTION

The invention will be explained in more detail below by using exemplary embodiments and with reference to the appended schematic drawings, in which FIG. 1 shows a plan view of a sensor module according to the invention having two sensor elements according to a preferred exemplary embodiment;

Figure 5:
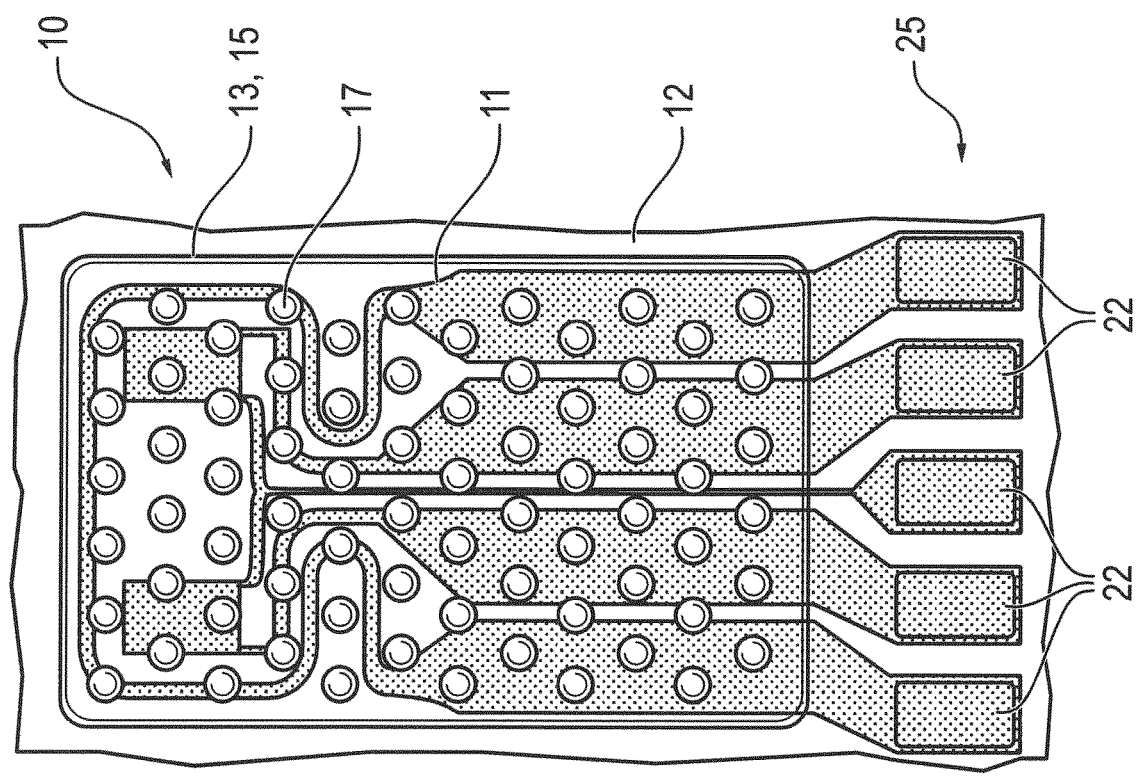
Figure 6:
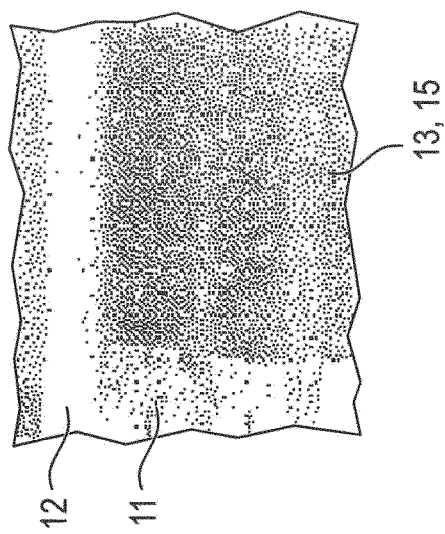
Figure 7:
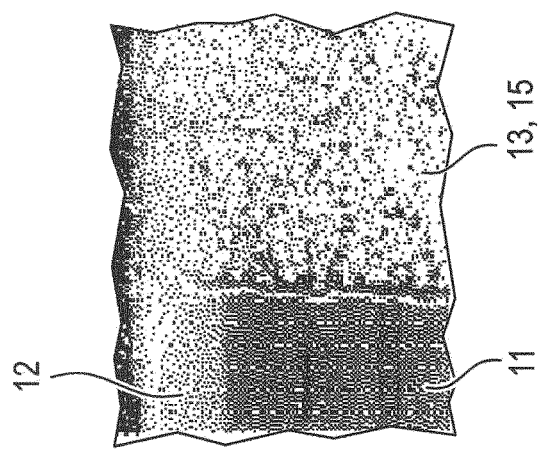
Figure 8:
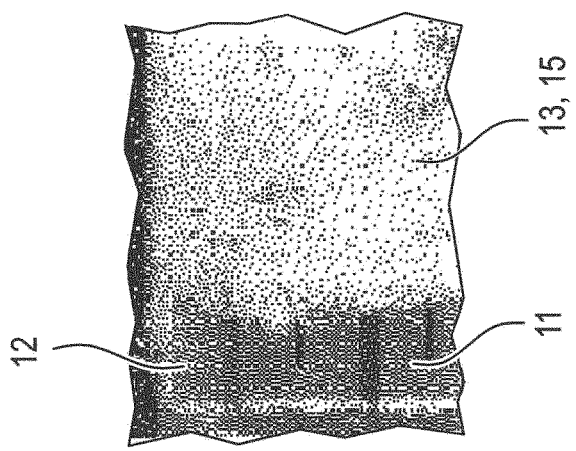

FIG. 5 shows a plan view of a sensor element according to the invention according to a further preferred exemplary embodiment, wherein the sensor element has surface profiling with a bump structure; and FIGS. 6-8 each show a plan view of a sensor element according to the invention according to a preferred exemplary embodiment, wherein surface profiling is formed by flocking the glass-ceramic coating with different aluminum particles.

DETAILED DESCRIPTION OF THE INVENTION

Figures 1, 2:
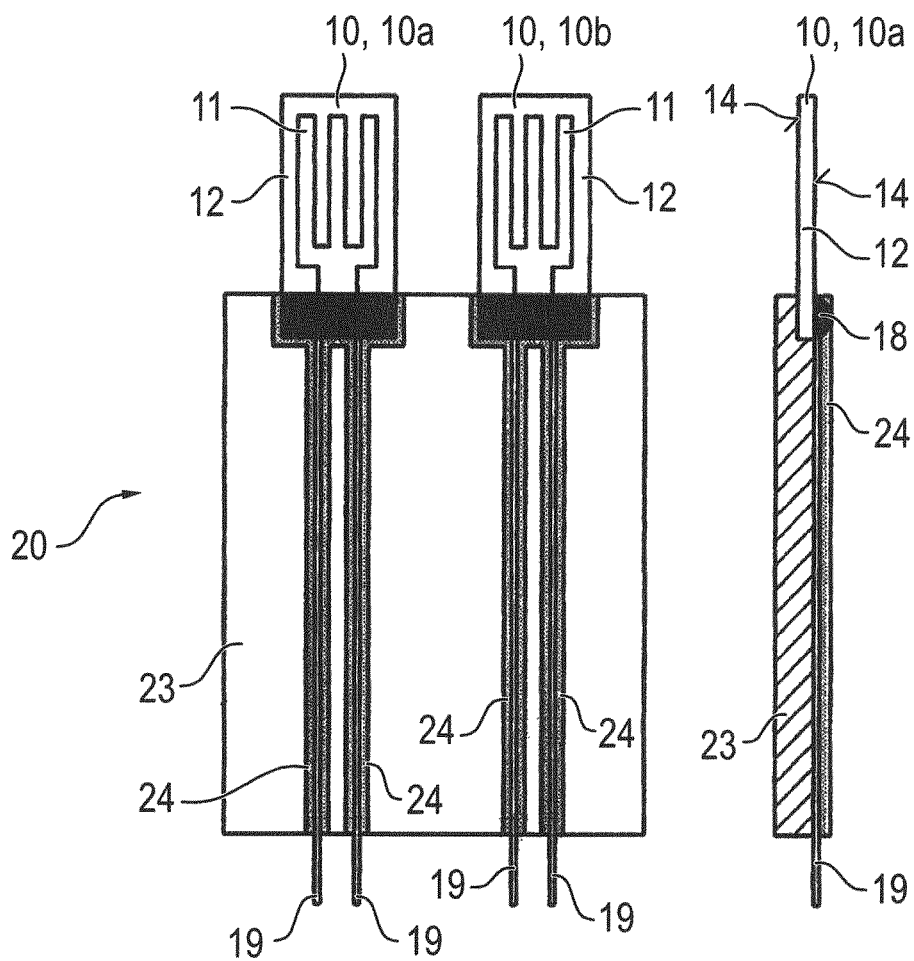
FIG. 2 shows a side view of the sensor module according to FIG. 1.

FIGS. 1 and 2 show a sensor module 20 which has two sensor elements 10. Each sensor element 10 comprises a thin-layer structure 11, which is arranged on a substrate 12. The thin-layer structure 11 is additionally covered by a glass-ceramic coating 13. In particular, the whole of the substrate 12 having the thin-layer structure 11 can be enhanced with a glass-ceramic coating 13.

The sensor elements 10 substantially form layer resistances, which are fixed in recesses in a substrate 23 of the sensor module 20. In particular, one or more of the sensor elements 10 can each form a platinum resistance measuring element, in particular a PT100 or PT1000 measuring element.

Each of the sensor elements 10 comprises a ceramic substrate 12, on which a thin-layer structure 11 is arranged. The thin-layer structure 11 is preferably formed in the shape of a meander on the substrate 12. In order to protect against external influences and for the purpose of electrical insulation, a glass-ceramic coating 13 is additionally arranged on the thin-layer structure 11. The glass-ceramic coating can envelop the whole of the substrate 12 having the thin-layer structure 11.

The substrate of the sensor module 20 bears wires 19 which are electrically connected to the sensor elements 10. In particular, the wires 19 are electrically connected to the thin-layer structures 11 of the sensor elements 10. In order to relieve strain, the connection is fixed by a fixing bead 18. Over the wires 19 there extends a glass covering 24, which is connected to the substrate 23, so that the wires 19 are longitudinally displaceably fixed underneath the glass covering 24.

The sensor elements 10 each have an outer surface 14 which comprises surface profiling 15. The surface profiling 15 is formed by a microstructure or nanostructure and will be described in more detail below with reference to FIGS. 4 to 8.

Figure 3:
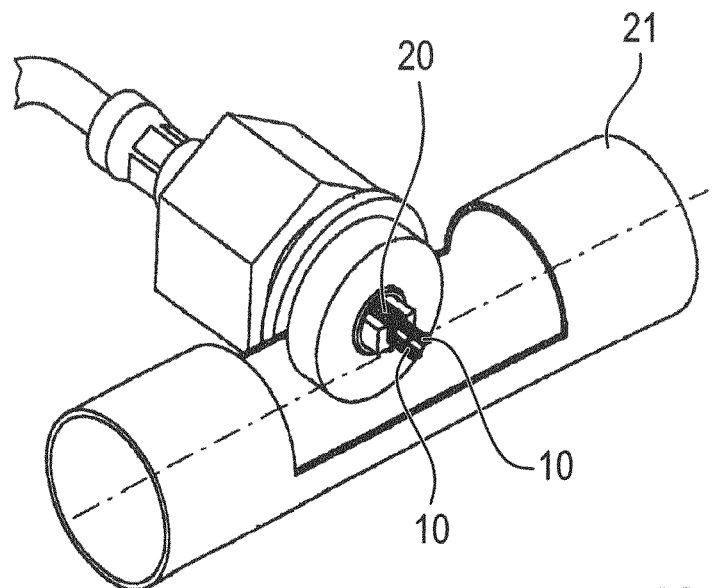
FIG. 3 shows a perspective view of a measuring assembly having a sensor element according to the invention according to a preferred exemplary embodiment.

FIG. 3 shows a typical area of use of the sensor element 10 and of the sensor module 20. In particular, FIG. 3 illustrates a measuring assembly, wherein a sensor module 20 is arranged in a flow pipe 21. The flow pipe 21 can be, for example, a pipe re-circulating exhaust gas in an exhaust-gas recirculation system. The sensor module 20 in this case serves as a flow sensor for measuring the mass flow in the flow pipe 21. To this end, provision is made for one of the sensor elements 10 of the sensor module 20 to be formed as a temperature measuring element 10a, and for a further sensor element 10 to be formed as a heat output measuring element 10b. The sensor module 20 is part of a measuring device which has a control loop. The control loop is preferably formed as a constant-temperature control loop. The constant-temperature control loop permits the heat output measuring element 10b to be heated with a constant temperature or a constant temperature difference with respect to the temperature measuring element 10a. Here, the constant-temperature control loop can be formed by an electric control circuit which has a bridge circuit and an amplifier. The mass flow of the fluid which flows past the heat output measuring element 10b effects a change in the power demand of the heat output measuring element 10b. In other words, the control loop must change the supply of electric power to the heat output measuring element 10b in order to keep the temperature constant when the mass flow of the fluid flowing past changes. The change in the energy demand of the heat output measuring element 10b to keep the reference temperature can be evaluated electronically, so that conclusions can be drawn about the mass flow of the fluid flowing in the flow pipe 21.

Figure 4:
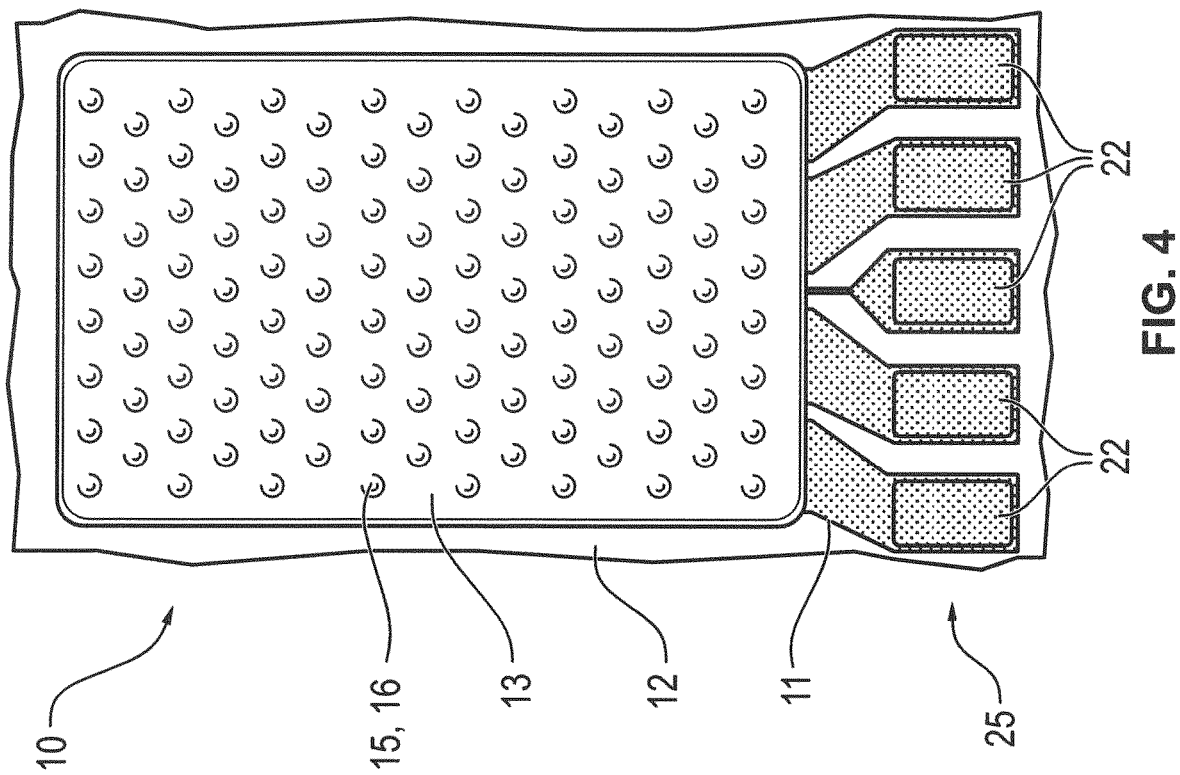
FIG. 4 shows a plan view of a sensor element according to the invention according to a preferred exemplary embodiment, wherein the sensor element has surface profiling with a dimple structure produced by means of screen printing.

FIG. 4 illustrates a sensor element 10 which has a substrate 12 and a glass-ceramic coating 13. Between the substrate 12 and the glass-ceramic coating 13 there is arranged a thin-layer structure 11, which opens into connecting contacts 22 in a lower region of the sensor element 10. The connecting contacts 22 are arranged in a connecting area 25 which, when the sensor element 10 is connected to a sensor module, is embedded in a corresponding recess in the sensor module 20.

In the sensor element 10 according to FIG. 4, the glass-ceramic coating 13 is produced by a screen-printing method and has a dimple structure 16. With the aid of an appropriate screen-printing mask, the starting material for forming the glass-ceramic coating is therefore applied to the sensor element 10 such that a dimple structure 16 is formed. A glass paste is preferably used as a starting material for the glass-ceramic coating 13. Said paste is applied to the sensor element 10 over the screen-printing mask, the screen-printing mask being imaged on the applied glass paste. This produces the dimple structure 16. The sensor element 10 is then heated, so that the glass paste hardens and forms a solid glass-ceramic coating 13. In the process, the dimple structure 16 is maintained.

FIG. 5 illustrates a similar sensor element 10, of which the glass-ceramic coating 13 is likewise produced by a screen-printing method. As distinct from the exemplary embodiment according to FIG. 4, however, a bump structure 17 instead of a dimple structure 16 is formed by means of the appropriately formed screen-printing mask. Here, provision is preferably made for the bumps of the bump structure 17 to project above a continuous glass-ceramic coating 13. In other words, the thin-layer structure 11 is preferably covered completely by a glass-ceramic coating 13, which additionally bears the bump structure 17 on the outer surface 14.

A further possible way of producing surface profiling 15 on the outer surface 14 of the glass-ceramic coating 13 is flocking of the glass-ceramic coating 13. Here, the sensor element 10 is firstly provided with a glass paste, to which coating particles are additionally applied. This can be done, for example, by dipping the sensor element 10 provided with the glass paste into a mass of coating particles or into a container having coating particles. The coating particles are pre-fixed by the glass paste. Excess coating particles are removed by being blown off. The glass paste with the coating particles is then baked in by heating the sensor element 10, so that a solid glass-ceramic coating 13 having surface profiling 15 on its outer surface 14 results. The glass paste and the coating particles are preferably formed from the same material. A suitable material is aluminum oxide ($Al_2O_3$). It is also possible to produce the glass paste and the coating particles from different materials, wherein it must be ensured that the coating particles are joined to the glass paste well during the baking to form a common glass-ceramic coating 13.

FIGS. 6 to 8 illustrate sensor elements 10 which have a glass-ceramic coating 13 which is produced by flocking. Here, different materials were used for the coating particles. It transpires that, as a result of the selection of the material of the coating particles, the surface profiling 15 is also changed accordingly. In the exemplary embodiment according to FIG. 6, the surface profiling 15 has a relatively fine structure of irregularly arranged and irregularly shaped bumps. In the exemplary embodiment according to FIG. 7, the bumps of the surface profiling 15 are likewise arranged and shaped irregularly. However, relatively coarse surface profiling arises. FIG. 8 shows surface profiling 15, the structure of which has a roughness which lies between the roughness of the surface profiling 15 according to FIG. 6 and the surface profiling 15 according to FIG. 7.

It is true of all the exemplary embodiments that both the substrate 12 and the glass-ceramic coating 13, including the surface profiling 15, preferably comprise an aluminum oxide, in particular are formed from $Al_2O_3$. Likewise, the substrate 23 of the sensor module 20 and the glass covering 24 of the sensor module 20 can be formed from an aluminum oxide, in particular $Al_2O_3$. The thin-layer structure 11 is preferably formed as a platinum thin-layer structure. In other words, the thin-layer structure 11 preferably comprises platinum and/or a platinum alloy. The same is preferably true of the connecting contacts 22, which likewise can consist of platinum or a platinum alloy, as part of the thin-layer structure 11. The wires 19 can be formed as nickel wires.

When the sensor element 10 is used as a flow sensor, the effect of the surface profiling 15 is that micro-vortices in the fluid flow are formed at the surface profiling 15, so that dirt particles and/or soot particles slide past the outer surface 14. Accumulation of dirt particles or soot particles is thus avoided.

LIST OF DESIGNATIONS

10 Sensor element
10a Temperature measuring element
10b Heat output measuring element
11 Thin-layer structure
12 Substrate
13 Glass-ceramic coating
14 Outer surface
15 Surface profiling
16 Dimple structure
17 Bump structure
18 Fixing bead
19 Wire
20 Sensor module
21 Flow pipe
22 Connecting contact
23 Substrate
24 Glass covering
25 Connecting area

The invention claimed is:

1. A sensor element for being disposed an exhaust gas stream from a combustion engine, the exhaust gas stream including dirt particles or soot particles, the sensor element comprising:
   a ceramic substrate;
   a thin-layer structure comprising platinum or a platinum alloy applied to the ceramic substrate; and
   a glass-ceramic coating applied to the respective platinum or the platinum alloy;
   wherein the glass-ceramic coating comprises an outer surface, the outer surface comprises a surface profiling;
   wherein the surface profiling has a dimple structure or a bump structure; and
   wherein the dimple structure or the bump structure has regularly or irregularly arranged dimples or bumps;
   wherein the glass-ceramic coating comprises a heat resistance of at least 800° C. in the exhaust stream;
   wherein the dimple structure or the bump structure comprises a diameter of a respective dimple or a bump, the diameter generating micro-vortices in the gas exhaust stream at a given flow velocity of the gas exhaust stream for sliding the dirt particles or soot particles past the outer surface; and
   wherein the respective dimple or a bump is dome shaped without edges and faces.

2. The sensor element as claimed in claim 1, wherein the surface profiling comprises $Al_2O_3$ particles fused with the glass-ceramic coating.

3. The sensor element as claimed in claim 1, wherein the outer surface of the glass-ceramic coating is flocked with additional coating particles, the coating particles forming the surface profiling.

4. The sensor element as claimed in claim 1, wherein the surface profiling is formed by a screen-printed structure or a laser-structured fused structure.

5. The sensor element as claimed in claim 1; wherein the surface profiling extends over the glass-ceramic coating and the substrate.

6. A sensor module comprising:
   a sensor structure having a plurality of sensor elements, at least one sensor element for being disposed in an exhaust gas stream from a combustion engine, the exhaust gas stream including dirt particles or soot particles, the at least one sensor element comprising
   a ceramic substrate;
   a thin-layer structure comprising platinum or a platinum alloy applied to the ceramic substrate; and
   a glass-ceramic coating applied to the respective platinum or the platinum alloy;
   wherein the glass-ceramic coating comprises an outer surface, the outer surface comprises a surface profiling;
   wherein the surface profiling has a dimple structure or a bump structure; and
   wherein the dimple structure or the bump structure has regularly or irregularly arranged dimples or bumps;
   wherein the glass-ceramic coating comprises a heat resistance of at least 800° C. in the exhaust stream;
   wherein the dimple structure or the bump structure comprises a diameter of a respective dimple or a bump, the diameter generating micro-vortices in the gas exhaust stream at a given flow velocity of the gas exhaust stream for sliding the dirt particles or soot particles past the outer surface; and
   wherein the respective dimple or a bump is dome shaped without edges and faces.

7. The sensor module as claimed in claim 6, wherein the at least one sensor element comprises at least one temperature measuring element or at least one heat output measuring element.

8. The sensor module as claimed in claim 6, wherein the sensor module comprises an anemometric measuring device having a constant-temperature control loop.

9. A measuring assembly comprising:
- a flow pipe;
- sensor module comprising
    - a sensor structure having a plurality of sensor elements, at least one sensor element for being disposed an exhaust gas stream from a combustion engine, the exhaust gas stream including dirt particles or soot particles, the at least one sensor element comprising a ceramic substrate;
    - a thin-layer structure comprising platinum or a platinum alloy applied to the ceramic substrate; and
    - a glass-ceramic coating applied to the respective platinum or the platinum alloy;
- wherein the glass-ceramic coating comprises an outer surface, the outer surface comprises a surface profiling;
- wherein the at least one sensor element projects radially into the flow pipe, and wherein at least one outer surface of the at least one sensor elements that is arranged within the flow has the surface-profiling;
- wherein the surface profiling has a dimple structure or a bump structure; and
- wherein the dimple structure or the bump structure has regularly or irregularly arranged dimples or bumps;
- wherein the glass-ceramic coating comprises a heat resistance of at least 800° C. in the exhaust stream;
- wherein the dimple structure or the bump structure comprises a diameter of a respective dimple or a bump, the diameter generating micro-vortices in the gas exhaust stream at a given flow velocity of the gas exhaust stream for sliding the dirt particles or soot particles past the outer surface; and
- wherein the respective dimple or a bump is dome shaped without edges or faces.

10. The measuring assembly as claimed in claim 9, wherein the flow pipe is a pipe that recirculates the exhaust gas stream.

* * * * *